(12) United States Patent
Favero

(10) Patent No.: US 11,919,596 B2
(45) Date of Patent: Mar. 5, 2024

(54) PEDAL FOR BICYCLES AND RELATED MANUFACTURING METHOD

(71) Applicant: FAVERO ELECTRONICS S.R.L., Arcade (IT)

(72) Inventor: Gino Favero, Arcade (IT)

(73) Assignee: FAVERO ELECTRONICS S.R.L., Arcade (IT)

( * ) Notice: Subject to any disclaimer, the term of this patent is extended or adjusted under 35 U.S.C. 154(b) by 0 days.

(21) Appl. No.: 17/908,172

(22) PCT Filed: Jul. 21, 2021

(86) PCT No.: PCT/IB2021/056596
§ 371 (c)(1),
(2) Date: Aug. 30, 2022

(87) PCT Pub. No.: WO2022/018660
PCT Pub. Date: Jan. 27, 2022

(65) Prior Publication Data
US 2023/0121900 A1    Apr. 20, 2023

(30) Foreign Application Priority Data
Jul. 21, 2020  (IT) .................. 102020000017662

(51) Int. Cl.
*B62J 45/42*    (2020.01)
*B62M 3/08*    (2006.01)
*G01L 1/22*    (2006.01)

(52) U.S. Cl.
CPC ............ *B62J 45/42* (2020.02); *B62M 3/08* (2013.01); *G01L 1/2206* (2013.01)

(58) Field of Classification Search
CPC .......... B62J 45/42; B62J 45/411; B62M 3/08; G01L 1/2206; G01L 3/24
See application file for complete search history.

(56) References Cited

U.S. PATENT DOCUMENTS

| 11,001,327 B1 | 5/2021 | Santurbane et al. |
| 2010/0024590 A1 | 2/2010 | O'Neill et al. |

(Continued)

FOREIGN PATENT DOCUMENTS

| CN | 203497117 | 3/2014 |
| CN | 106476971 | 3/2017 |

(Continued)

OTHER PUBLICATIONS

Machine translation of KR102375427 B1, Mar. 18, 2022 (Year: 2022).*

(Continued)

*Primary Examiner* — Vinh Luong
(74) *Attorney, Agent, or Firm* — KLINTWORTH & ROZENBLAT IP LLP

(57) ABSTRACT

A pedal for bicycles comprising a pedal-pin, which extends along a reference axis, and a pedal-body, which is coupled to the pedal-pin in a rotary free manner. An internal chamber is obtained in the pedal-pin and has an internal surface, which extends along the reference axis approximately coaxial to the latter. The pedal further comprises strain gauges, which are configured to detect electrical parameters indicative of the mechanical deformation of the pedal-pin, and an electronic circuit, which is configured to determine, based on the electrical parameters, the mechanical deformation of the pedal-pin. The strain gauges are rigidly fixed on the internal surface of the internal chamber by a thin fixing layer of adhesive material.

15 Claims, 9 Drawing Sheets

(56) References Cited

U.S. PATENT DOCUMENTS

| | | | |
|---|---|---|---|
| 2011/0067503 A1 | 3/2011 | Roudergues et al. | |
| 2012/0166105 A1 | 6/2012 | Biermann et al. | |
| 2012/0234108 A1 | 9/2012 | Janecek et al. | |
| 2013/0024137 A1 | 1/2013 | Grassi | |
| 2014/0165779 A1 | 6/2014 | Chen | |
| 2014/0273543 A1 | 9/2014 | Hanshew | |
| 2015/0377724 A1* | 12/2015 | Benkert | G01L 5/225 73/862.331 |
| 2016/0052584 A1 | 2/2016 | Sasaki | |
| 2016/0209281 A1 | 7/2016 | Carrasco Vergara et al. | |
| 2016/0375953 A1 | 12/2016 | Chen | |
| 2017/0358731 A1 | 12/2017 | Fukuda et al. | |
| 2018/0067003 A1* | 3/2018 | Michiwaki | G01M 5/0083 |
| 2018/0229799 A1 | 8/2018 | Lo | |
| 2021/0331760 A1* | 10/2021 | Fujimura | B62J 45/411 |
| 2021/0356338 A1* | 11/2021 | Olsen | G01L 1/14 |

FOREIGN PATENT DOCUMENTS

| | | | |
|---|---|---|---|
| CN | 207173874 | 4/2018 | |
| DE | 10007841 | 9/2001 | |
| DE | 202016000321 | 4/2016 | |
| DE | 202018005992 | 3/2019 | |
| EP | 2894088 A1 | 7/2015 | |
| EP | 3299067 | 3/2018 | |
| EP | 3566937 | 11/2019 | |
| FR | 2914902 | 10/2008 | |
| FR | 3078158 | 8/2019 | |
| JP | 2008221880 | 9/2008 | |
| JP | 2018051827 A | 4/2018 | |
| KR | 102375427 B1 * | 3/2022 | G01L 1/22 |
| WO | 2008/109914 | 9/2008 | |
| WO | 2022018660 | 1/2022 | |
| WO | 2022034497 | 2/2022 | |

OTHER PUBLICATIONS

Define Relative, Microsoft Bing, Dec. 16, 2022 (Year: 2022) (4 pages).

International Search Report and Written Opinion issued in connection with International Application No. PCT/IB2021/056596 and dated Nov. 8, 2021(16 pages).

International Preliminary Report on Patentability issued in connection with International Application No. PCT/IB2021/056596 and dated Jun. 27, 2022 (20 pages).

Office Action received for Japanse patent application No. JP2022-552342, dated Sep. 26, 2023, 6 pages including English translation.

* cited by examiner

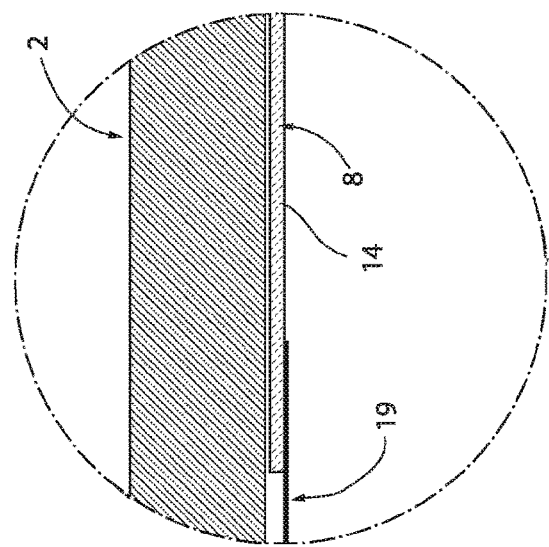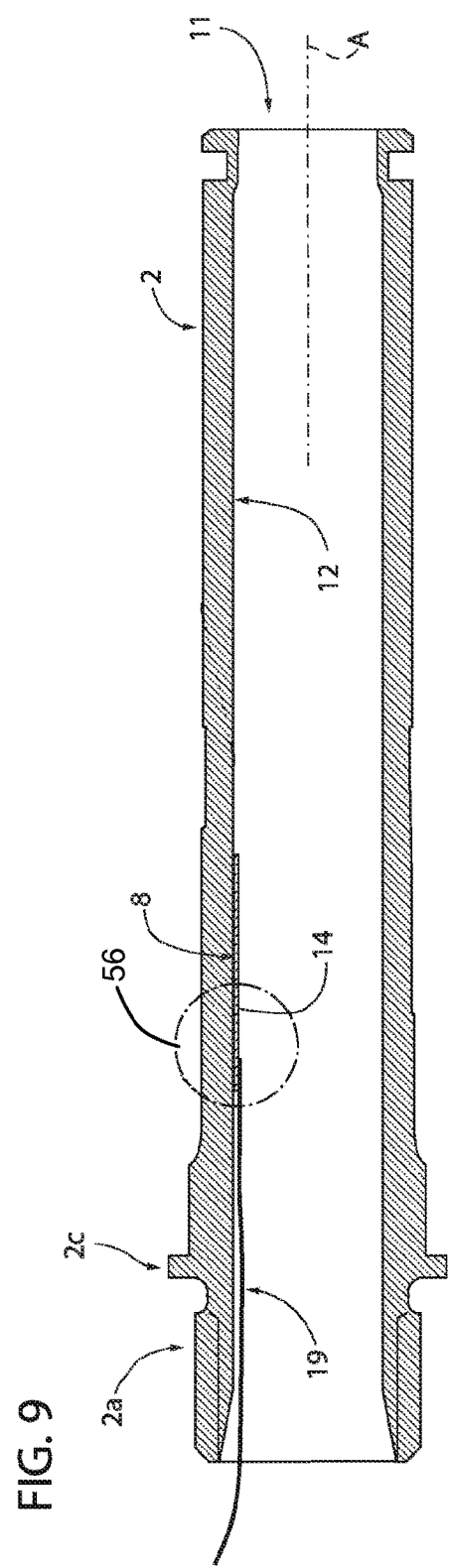
FIG. 9A
FIG. 9

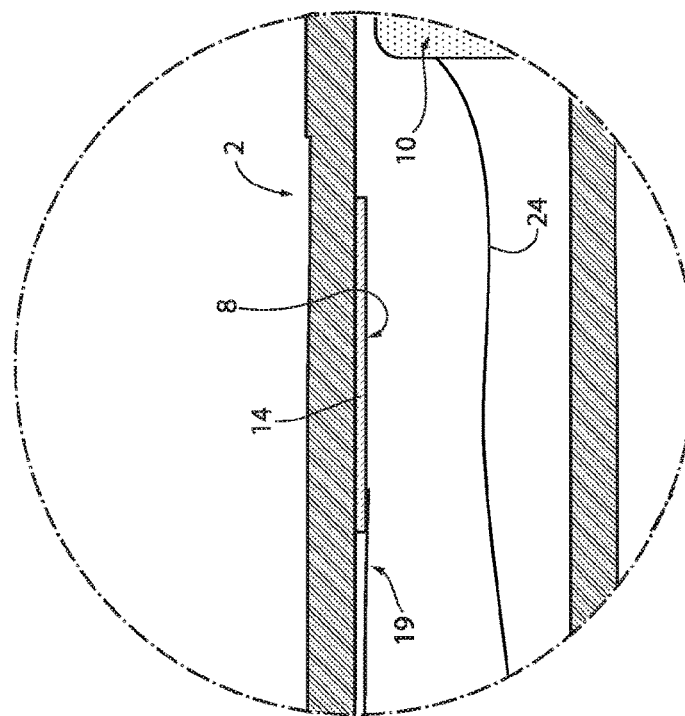
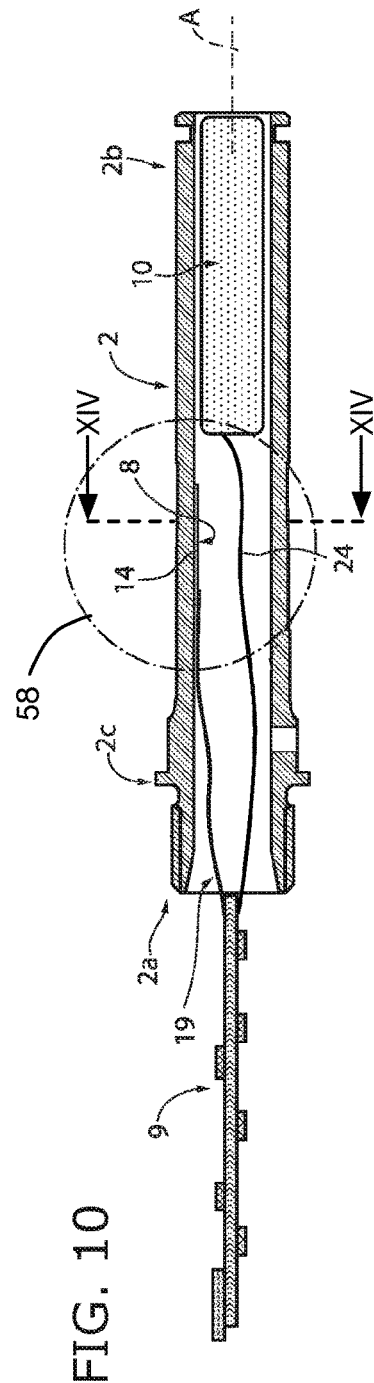
FIG. 10A
FIG. 10

PEDAL FOR BICYCLES AND RELATED MANUFACTURING METHOD

CROSS-REFERENCE TO RELATED APPLICATIONS

This patent application claims priority from Italian patent application no. 102020000017662 filed on Jul. 21, 2020, the entire disclosure of which is incorporated herein by reference.

TECHNICAL FIELD

The invention relates to a pedal for bicycles and to a related manufacturing method. In particular, the invention relates to a pedal provided with an electronic measurement system, which is designed to measure the power exerted by a cyclist while pedalling.

BACKGROUND ART

Bicycles, especially racing bicycles and bicycles for competitive cycling, are usually equipped with electronic measurement systems, which are provided with sensor devices and are designed to determine and display a series of parameters/quantities used to monitor the physical activity of the cyclist while pedalling, generally the force/power exerted upon the pedal and the pedalling frequency.

Some known electronic measurement systems are described, for example, in patent EP 2 304 403 B1.

According to a first embodiment shown in FIG. 7 of patent EP 2 304 403 B1, the electronic measurement system of the pedal is provided with a sensor comprising: a substrate consisting of two printed circuit boards having a substantially rigid structure, which firmly supports processor, memories, amplifiers, wireless transmitters, accelerometers and a series of strain gauges. The two printed circuit boards each have a rectangular, plate-like shape, are orthogonal relative to one another and are firmly connected to one another so as to form one single one-piece circuit element, which is rigid and T-shaped and is housed in the pedal-pin. The one-piece, T-shaped element is firmly fixed in the pedal-pin by means of a resin, which buries the two printed circuit boards and the relative components, in particular the strain gauges.

In a second embodiment shown in FIG. 8 of patent EP 2 304 403 B1, the substrate is a sheet-like support body made of plastic or metal and bent to 90°, which supports the strain gauges. The sensor device further comprises a printed circuit board, which houses the remaining electronic components and, in turn, is connected to the sheet-like support body of the strain gauges so as to form, with them, a one-piece body with a triangular section. The one-piece body with a triangular section is placed in the pedal-pin by means of a resin, which buries the three printed circuit boards.

In a third embodiment shown in FIG. 9a of patent EP 2 304 403 B1, the sensor device comprises a substrate, which consists of a metal cylinder. The substrate has, at the opposite longitudinal ends, annular projections, which are fixed in the pedal-pin by means of an adhesive. The sensor device further comprises a printed circuit board, which is fixed on the external surface of the metal cylinder so as to wrap it and has conductive traces. The sensor device further has strain gauges, which are fixed on the outer surface of the metal cylinder.

The substrate present in the sensor devices of the three embodiments described above is significantly large-sized and, therefore, takes up a large space inside the pedal-pin. In particular, the size of the substrate significantly reduces the space available in the pedal-pin to also house other circuits or electronic devices of the electronic measurement system, such as, for example, the battery, forcing them to be installed on the outside of the pedal-pin.

Furthermore, the presence of the substrate and the fixing thereof inside the pedal-pin is particularly disadvantageous because it affects the precision of the measurement. Indeed, the measurement of the deformation of the pedal-pin, which is caused by the force applied to the pedal by the cyclist, is not directly carried out on the pedal-pin, but is indirectly carried out on the substrate because of the coupling between the substrate and the pedal-pin, thus determining an error. Finally, the substrate present in the sensor devices described above to support the sensors affects the overall cost of the system.

US 2014/0273543 A1 describes a pedal-pin provided with a hole. The hole houses a sensor device, which is manufactured as described above and in EP 2 304 403 B1 and, as a consequence, suffers from the technical problems described above.

US2012/234108 describes a torque sensor system for electric bicycles, in which a "torque tube" is used, which is mounted on and supported by a shaft (hub) arranged in the rear axle of a pedelec or an electric bicycle. In use, the force exerted by the cyclist upon the pedal is transferred to a cassette body through a gear cassette. Then, the force is transmitted from the cassette body to the torque tube by means of a series of bearings.

This torque sensor system for electric bicycles in not suited to be used in the pedals of the bicycle, since its operation is based on the measurement of the torsion of the torque tube. First of all, the pedal-pin of a bicycle, on the one hand, is affected by a bending force and by a shear stress and, on the other hand, is not subjected to any torsion, since the pedal-pin freely rotates around its axis.

Since the torque sensor system for electric bicycles described in US2012/234108 is specifically structured to measure the torsion of the tube and measures neither the shear stress nor the bending force, it would evidently be completely unsuited to be used to measure the "shear or bending" deformation to which the pedal-pin is subjected while pedalling.

DISCLOSURE OF INVENTION

Therefore, the object of the invention is to provide a pedal for bicycles provided with a system to measure the force exerted by a cyclist while pedalling, which is capable of overcoming the technical problems described above.

This object is reached by the invention, as it relates to a pedal for bicycles and to a related manufacturing method according to the features set forth in the appended claims.

BRIEF DESCRIPTION OF THE DRAWINGS

The invention will now be described with reference to the accompanying drawings showing a non-limiting embodiment thereof, wherein.

BEST MODE FOR CARRYING OUT THE INVENTION

The invention will now be described in detail with reference to the accompanying Figures, so as to allow a person skilled in the art to carry it out and use it.

Possible changes to the embodiments described herein will be immediately evident to skilled people and the generic principles described herein can be applied to other embodiments and applications without for this reason going beyond the scope of protection of the invention as it is defined in the appended claims. Therefore, the invention cannot be considered as limited to the embodiments described and shown herein, but it has to be associated with the widest scope of protection possible in accordance with the principles and the features described and claimed herein.

The invention is basically based on the idea of installing strain gauges having a thin and extremely flexible sheet-like structure, without the aid of any rigid substrate/body to support them, directly on the internal surface of the internal chamber of a pedal-pin, by means of a thin fixing layer made of an adhesive material. In this way, the strain gauges are directly and exclusively supported by the internal surface of the internal chamber of the pedal-pin.

As described more in detail below, one of the technical effects obtained thanks to this configuration is that of significantly reducing the space taken up by the strain gauges inside the pedal-pin, without jeopardizing the measuring precision of the system. This allows manufacturers to "obtain" a space that can be used to also install in the pedal-pin other electric/electronic components used to determine the power and, hence, to conveniently use the pedal-pin as an external protection container, which completely includes/incorporates all the electric/electronic components of the electronic measurement system.

Figure 1:
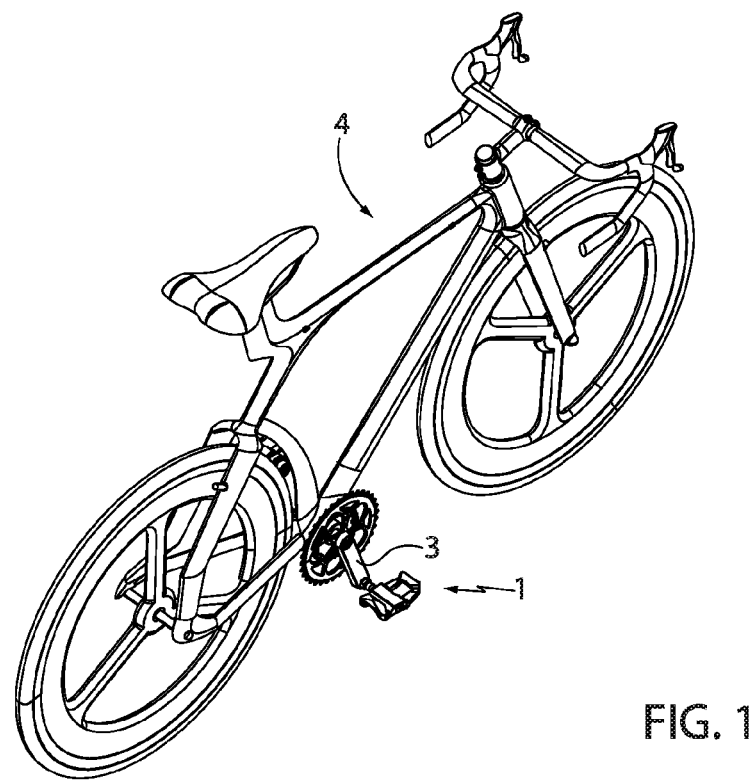
FIG. 1 schematically shows a bicycle provided with a pedal for bicycles according to the invention.
Figure 2:
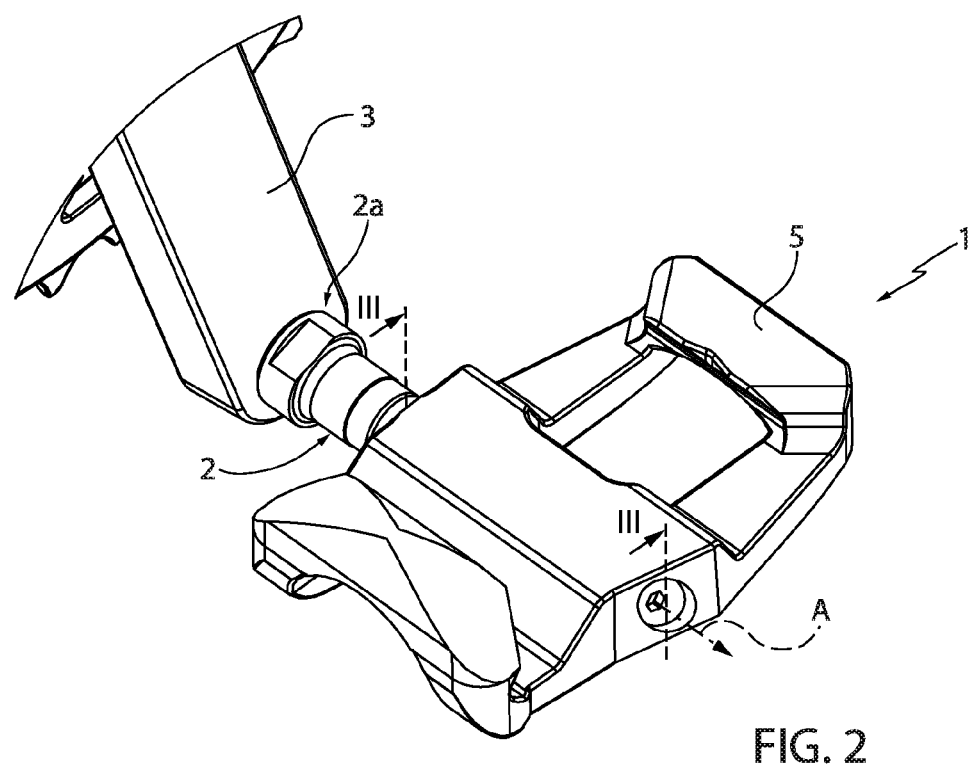
FIG. 2 is a perspective view, on a larger scale, of the pedal shown in FIG. 1.

With reference to FIGS. 1 and 2, number 1 indicates, as a whole, a pedal for bicycles, which is internally provided with an electronic measurement system, which is designed to measure electric quantities indicative of the pedalling of the cyclist.

The pedal 1 comprises a pedal-pin 2 preferably made of a metal material, which extends along a longitudinal reference axis A and is structured so as to be coupled to a crank 3 of a bicycle 4.

Figure 3:
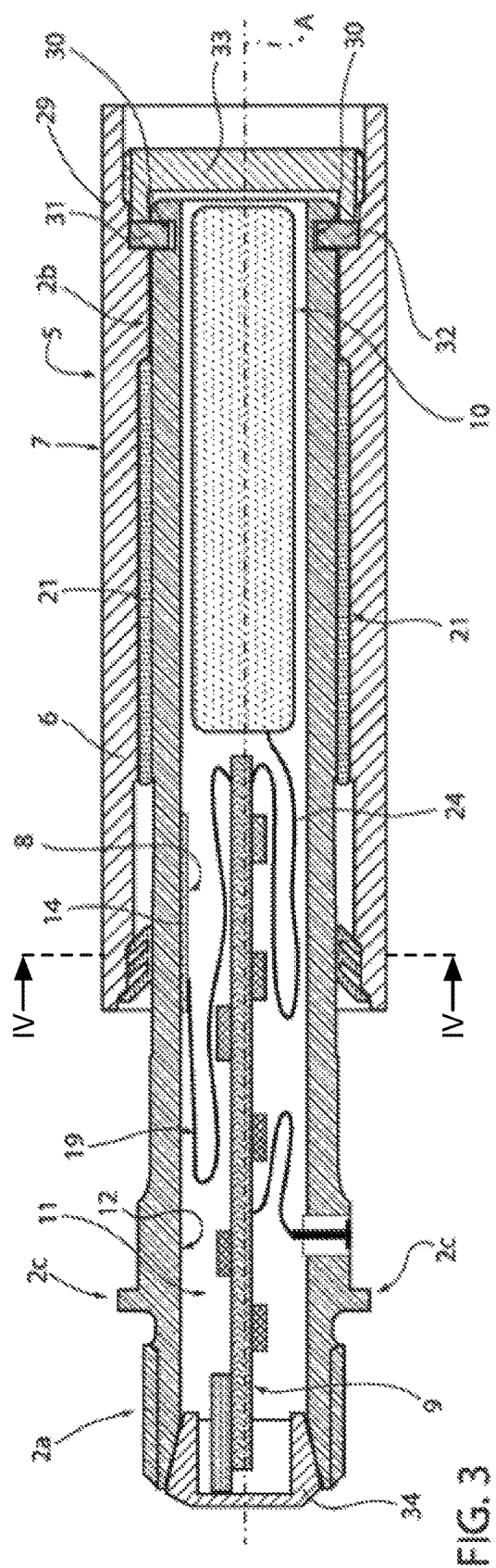
FIG. 3 is the longitudinal section III-III of the pedal shown in FIG. 2.

With reference to FIGS. 2 and 3, the pedal-pin 2 can have a first, preferably threaded end 2a, which is coupled to the corresponding crank 3 of the bicycle 4. The pedal-pin 2 can have a preferably cylindrical, oblong shape and can project from the crank 3 along the longitudinal axis A, preferably approximately orthogonal to the crank 3. The pedal-pin 2 further has a second end 2b, which is axially opposite relative to the end 2a.

According to the example shown in FIGS. 1-3, the pedal pin 2 can comprise an annular crown or flange 2a coaxial to the axis A, which is arranged approximately in the area of an internal annular edge of the threaded portion of the end 2a and is designed to strike against the crank 3, when the pedal 1 is connected to the crank 3.

The pedal 1 further comprises a pedal-body 5, which is coupled to the pedal-pin 2 in a rotary free manner, so that it can rotate around the longitudinal axis A relative to the pedal-pin 2. In the example shown in FIG. 3, the pedal-body 5 comprises a tubular body, namely a hub 6 internally having an opening or hole, preferably a through opening or hole with a circular section, which extends along the longitudinal axis A.

As shown in the example disclosed herein, the hub 6 can conveniently be coupled to the pedal-pin 2 in a rotary free manner by means of a bushing 21 or a bearing, so that it can freely rotate around the longitudinal axis A. According to the example shown in FIG. 3, the bushing 21 or bearing is fitted on the pedal-pin 2 approximately in an intermediate position, circa adjacent to the second end 2b.

In the example shown in FIGS. 2 and 3, the pedal-body 5 further comprises a foot-resting portion 7, which is firmly/rigidly connected to the hub 6, so as to preferably form one single one-piece body together with the latter, and is structured so as to form a support body for the foot of the cyclist. For instance, the foot-resting portion 7 can comprise an approximately plate-like structure, which extends on a plane approximately parallel to the longitudinal axis A and on which, in use, the cyclist places his/her foot. Obviously, the shape/structure of the foot-resting portion 7 can be different from the plate-like one described above and/or shown in the accompanying Figures. Furthermore, the foot-resting portion 7 can preferably be shaped/structured so as to be connected/coupled to a shoe of the cyclist by means of known pads/bumpers, which are generally used with the pedals or racing bicycles of mountain-bikes.

The pedal 1 further comprises an electronic power measurement system, which, in turn, is provided with: a series of strain gauges 8, which are connected to one another by means of electrical traces so as to form one or more measurement circuits, preferably bridge circuits, and are designed to provide electric measurement signals indicative of the deformation measured/detected on the pedal-pin 2; an electronic processing circuit 9, which is electrically connected to the strain gauges 8 so as to receive the electric measurement signals and is configured to determine the deformation of the pedal-pin 2 caused by the force exerted by the cyclist upon the pedal 1 and, hence, upon the pedal-pin 2 while pedalling, based on the electric measurement signals; and at least one power storage device 10, for example one or more electric batteries designed to provide the electrical energy needed for the operation of the electronic power measurement system.

Figure 4A:
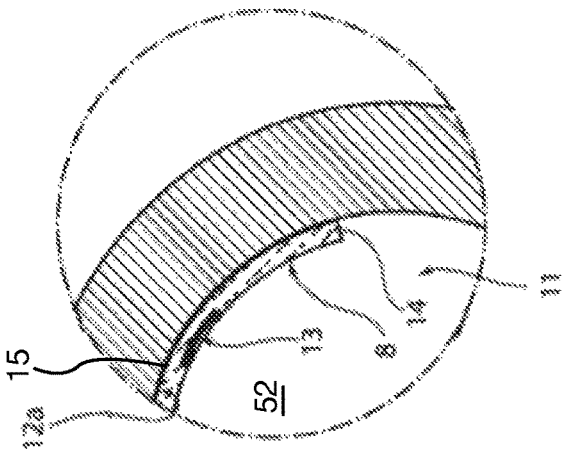
FIG. 4A is an enlarged view of a portion 50 of the cross section of the pedal-pin shown in FIG. 4, FIGS. 5A and 5B are two schematic views, with and without the presence of an applicator sheet respectively, of the strain gauges and of a portion of flexible printed circuit board present in the pedal-pin according to the invention, FIGS. 6 to 10A schematically show corresponding operating steps of the method for manufacturing the pedal for bicycles according to the invention (FIGS. 9A and 10A are enlarged views of portions 56 and 58 of the schematic views of FIGS. 9 and 10, respectively)
Figure 4:
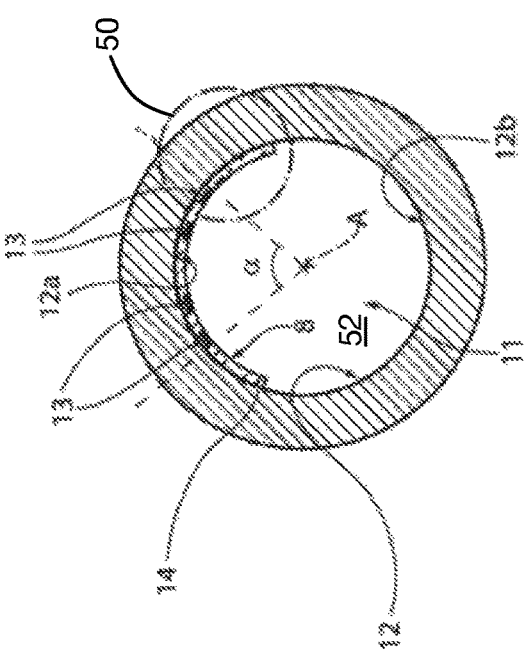
FIG. 4 is a cross section IV-IV, on a larger scale and with parts removed for greater clarity, of the pedal-pin shown in FIG. 3.

According to FIGS. 3 and 4, an internal opening or chamber 11 is obtained in the pedal-pin 2, extends along the axis A, preferably coaxial to the latter, and has an internal surface 12 having a section, orthogonal to the axis A, that preferably is approximately circular (FIG. 4).

In the example shown in FIG. 3, the internal chamber 11 extends over the entire axial length of the pedal-pin 2 between the two opposite ends thereof so as to form an axial through hole. Obviously, the invention is not limited to an internal chamber 11 according to FIG. 1, namely consisting of a through hole, but it can alternatively entail other solutions. For example, according to a variant (which is not shown herein) alternative to the preferred embodiment described above, the internal chamber 11 can consist of a dead hole extending along the axis A, starting from one of the two axial ends 2a, 2b of the pedal-pin 2.

Preferably, the internal chamber 11 has an internal diameter which is smaller than or equal to approximately 9 mm.

According to the preferred embodiment shown in FIGS. 3, 4 and 5, the strain gauges 8 have a highly flexible, thin, laminar or sheet-like structure. The thickness of the strain gauges can range from circa 0.05 mm to 0.15 mm, preferably circa 0.08 mm. The strain gauges 8 comprise at least one thin flexible film 14 made of a highly flexible (soft), electrically insulating material and one or more strain sensitive patterns 13, which are firmly arranged on/in the film 14.

Figure 15A:
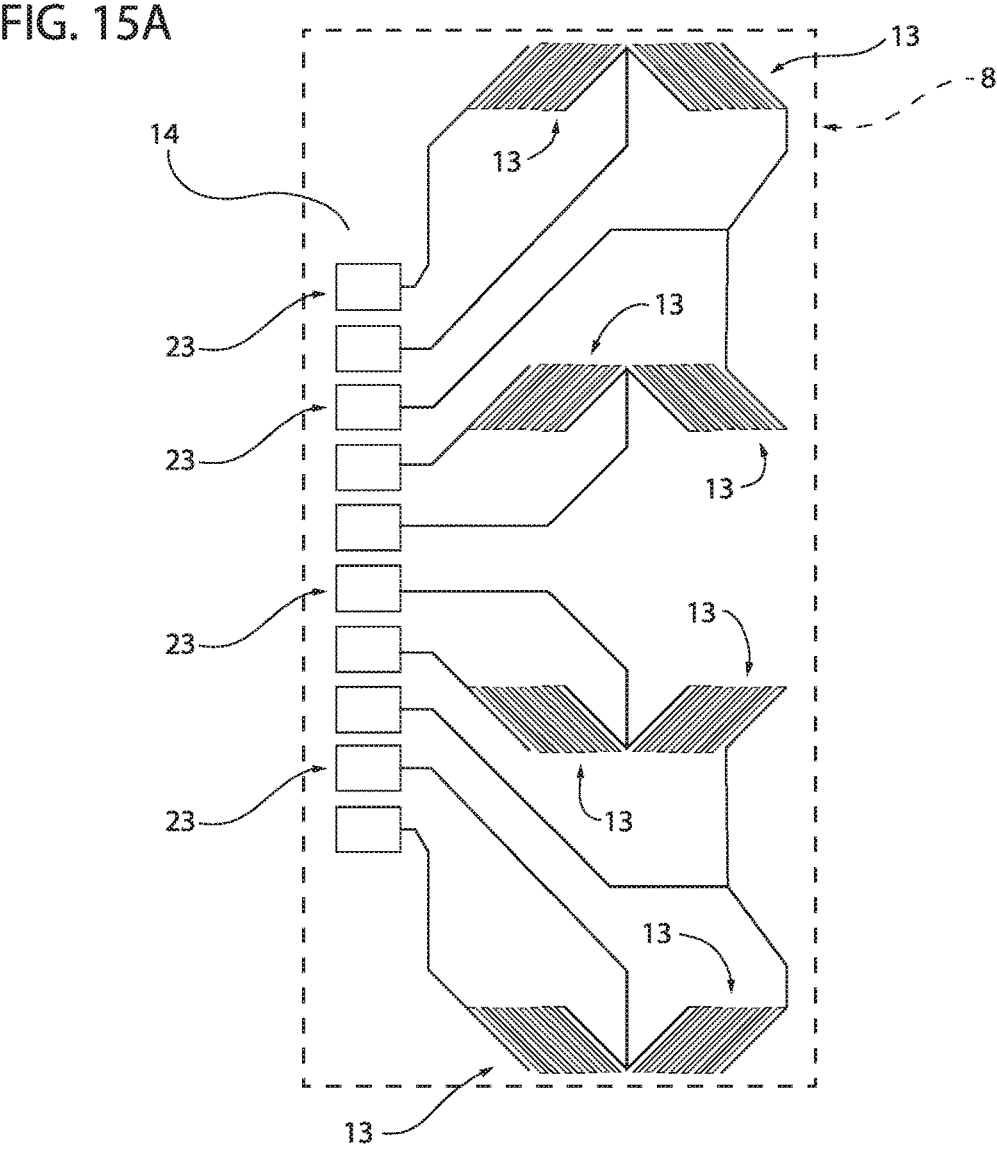
Figure 15B:
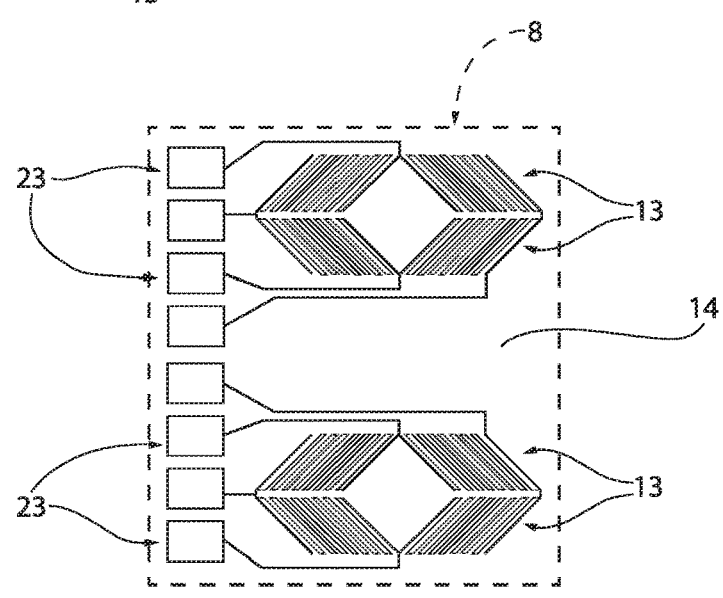

The strain sensitive patterns 13 can consist of a series of parallel strips made of an electrically conductive material, which are arranged on the film 14 according to an orientation that is parallel to the longitudinal axis A of the pedal-pin or, alternatively, according to an orientation at a 45 degree angle relative to the longitudinal axis A (strain gauges for the measurement of shear stress, which can have a configuration of the type shown in examples of FIGS. 15A and 15B).

The film 14 can comprise electric traces connecting the strain sensitive patterns 13 to connection pads 23.

The film 14 can preferably have a quadrangular—for example, rectangular or square—shape and is firmly fixed on the internal surface 12 of the internal chamber 11 by means of an adhesive material-based fixing layer 15. Obviously, the shape and/or the size of the film 14 can change depending on the number of strain gauges 8.

The adhesive material can comprise, for example, acrylic glues and/or thermosetting glues or the like. Obviously, the adhesive material can change depending on a series of constructive parameters, such as for example the material of the pedal-pin 2 and the material of the film 14 or the like. Obviously, the adhesive material can depend on the application features of the strain gauges 8 (established, for example, by the manufacturer of the strain gauges).

Figure 5A:
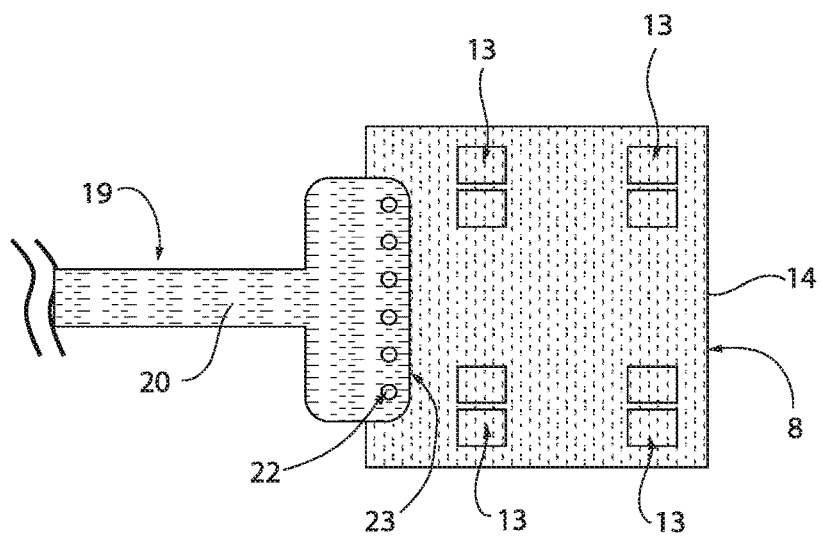

According to the preferred embodiment shown in FIGS. 4 and 5A, the film 14 can be sized so as to exclusively cover an angular area or portion 12a of the internal surface 12, thus leaving the remaining angular area or portion 12b uncovered. In the example shown herein, the film 14 is sized so as to cover the sole portion 12a having an approximately semicircular section orthogonal to the axis A and leave the remaining area or portion 12b, which also has an approximately semicircular section complementary to the other section, uncovered.

According to the preferred embodiment shown in FIGS. 4 and 5A, the strain gauges 8 can comprise two groups of four strain sensitive patterns 13, which are connected to one another so as that each group forms a Wheatstone-bridge measuring resistive circuit.

According to the embodiment shown in FIG. 4, the strain sensitive patterns 13 of the strain gauges 8 are arranged on the internal surface 12 of the internal chamber so as to lie within an arc of a circle having an angle $\alpha$ measuring less than 150°.

Preferably, the two groups of four strain sensitive patterns 13 can conveniently be arranged on the film 14 as described in Italian patent application no. 102019000022536 of the Applicant, whose contents (description and drawings) are completely included herein by way of reference.

Therefore, the strain gauges 8 with a thin and flexible sheet-like structure are firmly and rigidly fixed on the internal surface 12 of the internal chamber 11 of the pedal-pin 2 through their film 14 and the fixing layer, namely without the use of a rigid support body axially fitted into the internal chamber 11.

In other words, the strain gauges 8 are directly fixed on the internal surface 12 by mean of their film 14 and of the fixing layer, so as to adhere to it in such a way that they conveniently let the internal space of the internal chamber 11 free from their occupation (i.e. not engaged). Hence, the strain gauges 8 with a thin and flexible sheet-like structure form one single body (in one piece) with the pedal-pin 2 and internally define, on the side radially opposite the internal surface 12, an empty chamber.

Therefore, the internal surface 12 of the internal chamber 11 serves as a support for the film 14 of the strain gauges 8 through the fixing layer and, unlike known solutions mentioned above, it does not require the use of other internal bodies or inserts fitted into the internal chamber 11.

Hence, the strain gauges 8 are not supported by and/or connected to any rigid support substrate/body axially fitted into the internal chamber 11.

In other words, the internal chamber 12 does not house, on the inside, any rigid substrate/body to support the strain gauges 8.

A technical effect obtained thanks to the fixing of the strain gauges with a thin sheet-like structure on the internal surface 12 of the internal chamber 11 through the thin film 14 and the thin fixing layer is that of eliminating the overall space taken up by the strain gauges 8 themselves inside the internal chamber 11. Indeed, the strain gauges 8 only take up a portion 12a of the area of the internal surface 12 and have a total thickness in the range of a tenth of millimetre.

A further technical effect obtained thanks to the fixing of the strain gauges 8 on the internal surface 12 of the internal chamber 11 through the film 14 and the fixing layer is that of eliminating the need to use a rigid body fitted into the chamber in order to externally support the strain gauges, as discloses for example in US20140273543 and US2010/0024590 A.

A further technical effect is that of increasing the free (empty) space available inside the chamber 11 and of being able to insert, thanks to that and in said free space (i.e., an inner containment space 52), other electronic components of the electronic measurement system, in particular the battery and the printed circuit board, so as to obtain a measurement system that is completely included in the pedal-pin 2 without components on the outside.

According to the preferred embodiment shown in FIG. 3, the electronic circuit 9 is arranged inside the internal chamber 11. In the example shown herein, the electronic circuit 9 is arranged inside the internal chamber 11 so as to be surrounded by the strain gauges 8 fixed on the internal surface 12. The electronic circuit 9 can comprises a quadrangular printed circuit board.

According to a preferred embodiment, the electronic circuit 9 further is electrically connected to the strain gauges 8 by means of an electrical connection circuit 19. Preferably, the electrical connection circuit 19 comprises a rectangular sheet with an oblong shape, for example a band-shaped one, which projects approximately from a side of the film 14 approximately coplanar to the latter and extends towards the electronic circuit 9. The electric connection circuit 19 can be obtained by means of a thin film 20 made of an electrically insulating and highly flexible material, on which there are the electrical connections (electrical traces or wires) between the electronic circuit 9 and the strain sensitive patterns 13. To this aim, at the two opposite ends of the film 20 there can conveniently be connection pads 22.

Figure 12:
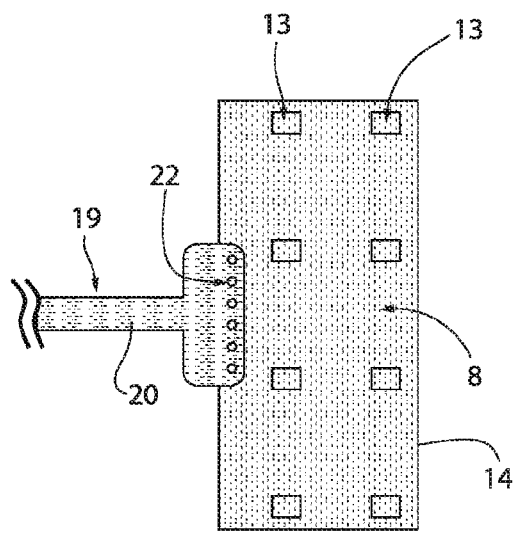
Figure 13:
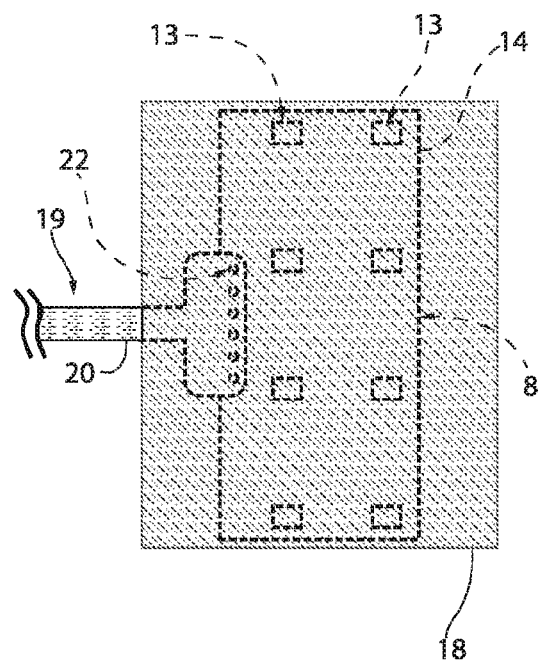
Figure 14:
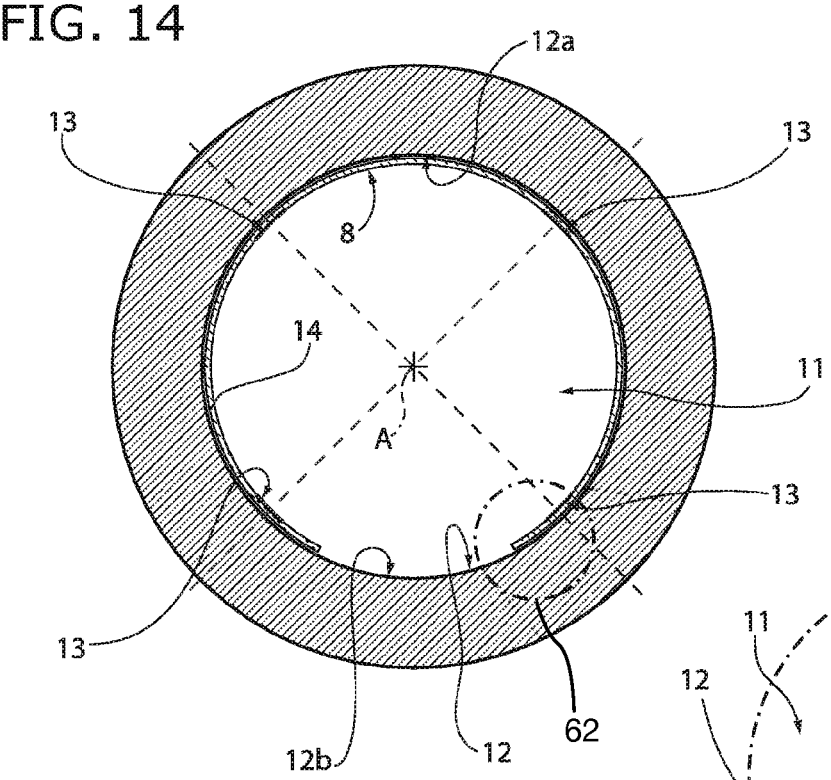
FIG. 14 is a sectional view of the pedal-pin, on a larger scale and with parts removed for greater clarity, provided with the strain gauges shown in FIGS. 12 and 13.
Figure 14A:
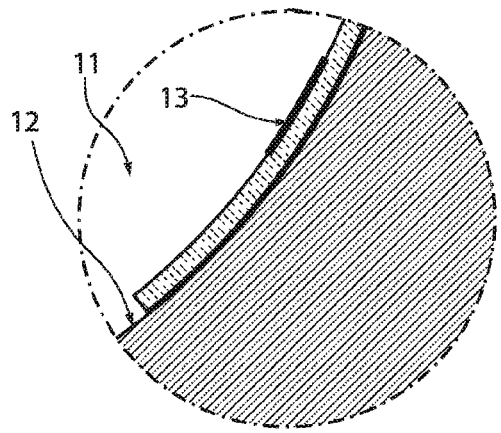
FIG. 14A is an enlarged view of a portion 62 of the sectional view of the pedal-pin shown in FIG. 14, FIGS. 15A and 15B show corresponding views of shear strain gauges comprises in the pedal-pin according to a possible embodiment of the invention.

Obviously, the invention is not limited to strain gauges 8 according to FIGS. 4 and 5A, but it can also comprise other architectures and/or geometries having a different arrangement of the strain sensitive patterns 13 on the film 14. For example, according to a different, alternative embodiment shown in FIGS. 12 and 14, the strain sensitive patterns 13 are arranged in pairs on the film 14 so that, when they are arranged on the internal surface 12 of the internal chamber 11, each pair of strain sensitive gauges 13 can be arranged on the film 14 so as to be angularly spaced apart from the adjacent pair of strain sensitive patterns 13 by an angle of approximately 90°. In this configuration shown in FIGS. 12 and 14, the film 14 of the strain gauges 8 is sized so as to approximately cover (in sectional view) the entire circumference of the cross section of the internal chamber 11.

According to the preferred embodiment shown in FIG. 3, the strain gauges 8 are arranged on the internal surface 12 of the pedal-pin 2 so as to conveniently be approximately arranged between the bushing 21 and the flange 2c.

According to the preferred embodiment shown in FIG. 3, the power storage device 10 is arranged in the internal chamber 11 and can comprise, for example, at least one electric battery, which is electrically connected to the electronic circuit 11 by means of electrical connection wires and/or circuits 24.

According to the preferred embodiment shown in FIG. 3, the pedal 1 further preferably comprises a mechanical locking member 29, which is structured so as to axially lock the hub 6 of the pedal-body 5 on the pedal-pin 2 so as to prevent the pedal-body 5 from slipping out of the pedal-pin 2 along the longitudinal reference axis A.

According to an explanatory embodiment shown in FIG. 3, on the pedal-pin 2 there is obtained an annular seat 30 coaxial to the axis A. The annular seat 30 has, on the inside, a cylindrical bottom wall and two side walls, which define two annular abutments on the pedal-pin 2. According to the embodiment shown in FIG. 3, the annular seat 30 and the relative annular abutments are obtained on the edge of the pedal-pin 2 adjacent to the end 2b. In the example shown in FIG. 3, the mechanical locking member 29 further comprises two distinct and independent half-annular bodies 31 and 32 having cross sections with the shape of semicircular segments, preferably approximately complementary to one another and to the annular seat 30.

The two half-annular bodies 31 and 32 are arranged in the annular seat 30 so that they can freely rotate in the latter around the axis A relative to the pedal-pin 2. The two half-annular bodies 31 and 32 are structured so as to preferably strike against the annular abutments of the annular seat 30 in order to be axially locked and, hence, not be able to move relative to the pedal-pin 2 along the longitudinal axis A. The two half-annular bodies 31 and 32 radially project from the seat 30 and strike against an internal annular abutment of the hub 6, which, in turn, is interposed between the seat 30 and the axial end of the bushing 21.

According to the preferred embodiment shown in FIG. 3, the pedal 1 further comprises a closing cap 33, which is connected to the end of the hub 6 opposite the crank 3. The closing cap 33 can have the shape of a threaded cup-shaped body, which is screwed onto the threaded edge of the hub 6 in order to strike against the projecting portion of the half-annular bodies 31 and 32. The closing cap 33 axially holds the hub 6 in position so as to prevent it from axially moving.

According to the preferred embodiment shown in FIG. 3, the opening of the internal chamber 11 obtained at the end 2a is closed by a closing cap 34.

With reference to FIGS. 6 to 10, the method for manufacturing the pedal 1 will now be described with reference to the operating steps to be carried out in order to fix the strain gauges 8 on the internal surface 12 of the internal chamber 11 of the pedal-pin 2.

According to FIGS. 5B and 6 to 10, the method basically comprises the step of: prearranging a thin applicator sheet 18 made of a flexible material, placing/coupling the strain gauges 8 on/to the applicator sheet 18, shaping the applicator sheet 18 so as to form a tubular element that can be inserted into the internal chamber 11, applying an adhesive material-based fixing layer onto the strain gauges 8 and/or onto the internal surface 12 of the internal chamber 11, inserting the shaped applicator sheet 18 supporting the strain gauges 8 into the internal chamber 11 so as to place the strain gauges 8 in a predetermined axial position along the reference axis A, and radially widening/expanding the applicator sheet 18 in the internal chamber 11 so as to place the strain gauges 8 on the internal surface 12 in such a way that they are fixed to the latter through the fixing layer.

Figure 5B:
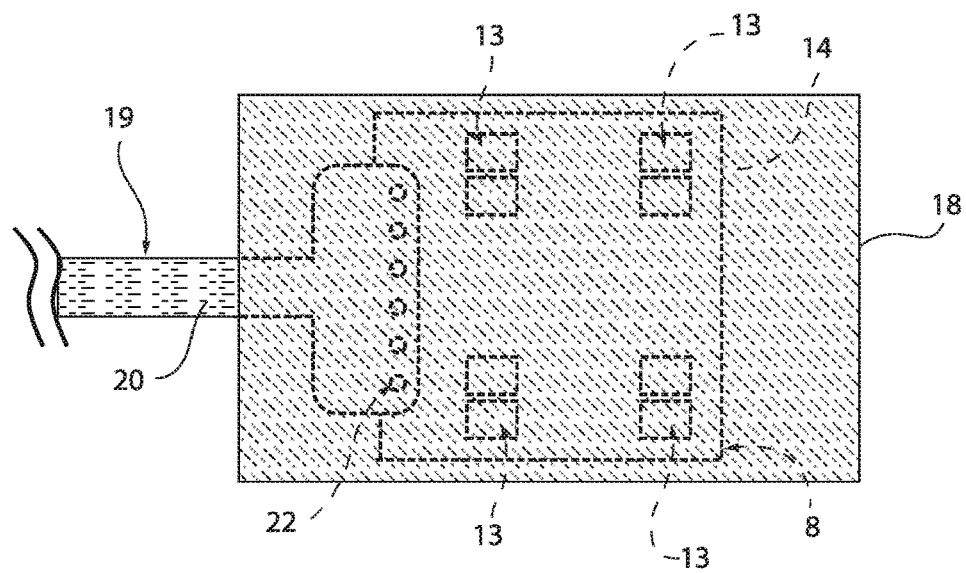

According to a preferred embodiment, the method comprises the step of electrically connecting the electrical connection circuit 19 to the strain gauges 8. This operation can be carried out, for example, by connecting, by means of welding, the connection pads 22 of the electrical connection circuit 19 to the connection pads 23 of the strain gauges 8 (FIGS. 5A and 5B).

The strain gauges 8 can be arranged on/coupled to the applicator sheet 18 (FIG. 5B), for example by means of an adhesive material layer. The applicator sheet 18 can conveniently comprise a Mylar® sheet, which has an adhesive surface, which is suited to apply the strain gauges 8 and is structured so that it can easily be detached from the strain gauges 8 after they have been firmly fixed on the inner surface 11 of the pedal-pin 2 (as described in detail below).

Figure 6:
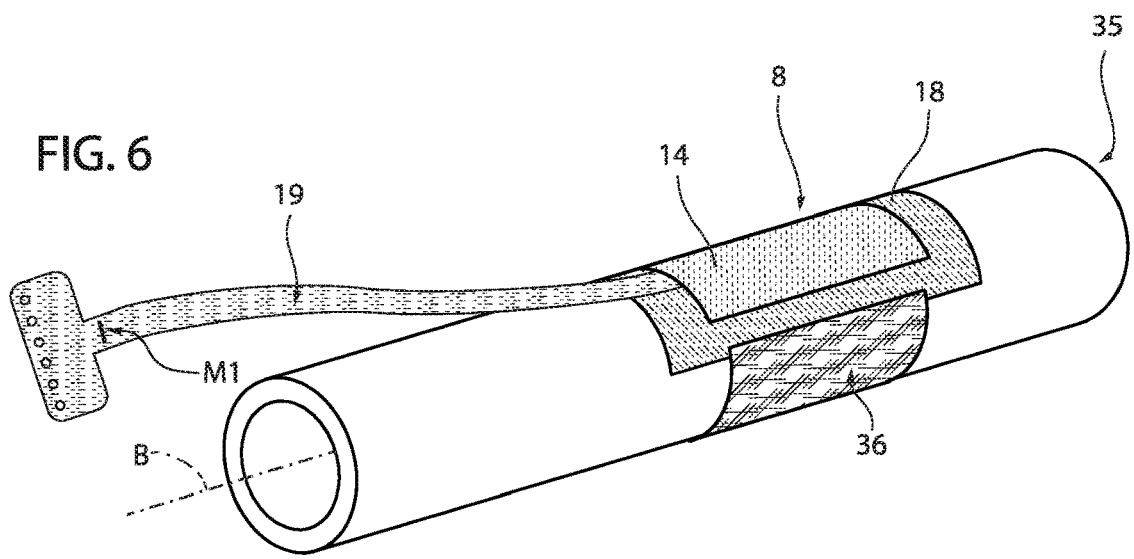

According to the preferred embodiment shown in FIG. 6, the step of shaping the applicator sheet 18 can comprise the step of positioning the applicator sheet 18 with the strain gauges 8 so that it lays on a mounting tool 35. The mounting tool 35 can comprise, for example, a casing with a preferably approximately tubular shape, which extends along an axis B and is made of an easily deformable material, which is suited to radially widen/expand.

The casing can comprise a tubular element with a circular section and made of an elastic silicone material, which has a closed end and has an external diameter, which, in a rest condition, namely in the absence of expansion, is smaller than the internal diameter of the internal chamber 11, so that it can be fitted into the latter. The tubular element of the mounting tool 35 can have a greater length than the length of the applicator sheet 18.

The applicator sheet 18 can be placed on the external surface of the tubular element of the mounting tool 35 and is fixed to the latter, for example, by means of at least one adhesive tape 36, which is partially wound on the tubular element on the side diametrically opposite the applicator sheet 18 and is fixed to the opposite flaps of the applicator sheet 18 so as to cause the latter to adhere to the tubular element. The adhesive tape 36 can conveniently be made of an elastic material and/or of a lower-adhesiveness material to as to allow the tubular element to expand without causing the detachment of the applicator sheet 18.

The method comprises the step of applying the glue/adhesive material on the external surface of the film 14 of the strain gauges 8 on the opposite side relative to the tubular element lying underneath. The method further comprises, in addition or alternatively, the step of applying a thin layer made of an adhesive/glue material on the internal surface 12 of the internal chamber 11, on which the strain gauges 8 have to be fixed.

Figure 7:
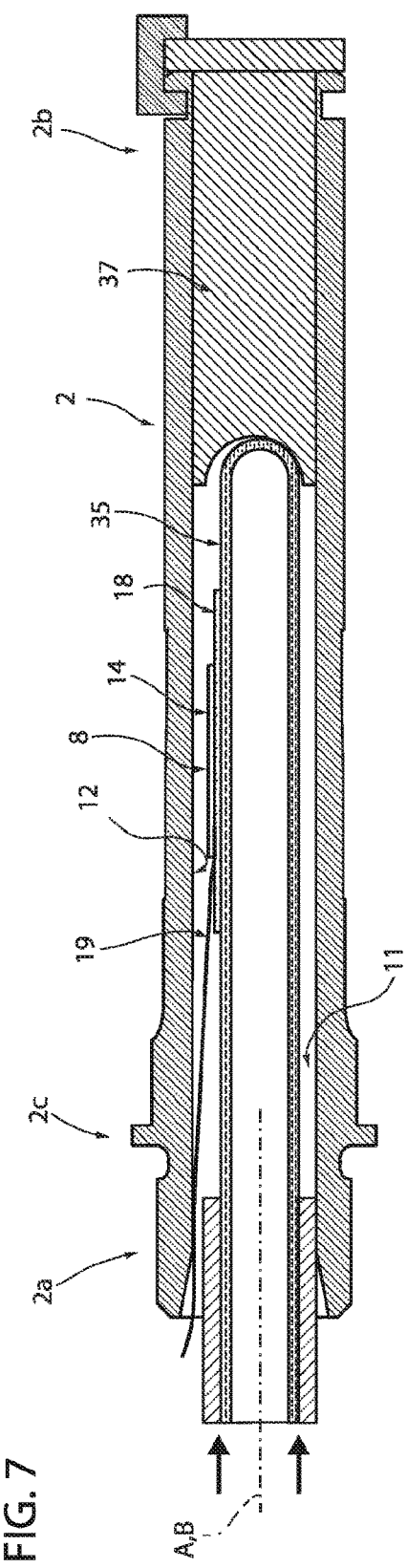

With reference to FIG. 7, the method further comprises the step of axially fitting the tubular element of the mounting tool 35, in the rest—namely, non-expended—condition, into the inner chamber 11 until the film 14 and the relative strain sensitive patterns 13 are placed in a predetermined axial position corresponding to the position in which the strain gauges 8 have to be applied in the internal chamber 11 of the pedal-pin 2. To this aim, the method can conveniently entail fitting into the internal chamber 11, on the opposite side relative to the fitting end of the tubular element of the mounting tool 35, a stopping member 37, which is sized so as stop the axial fitting of the mounting tool 35 in a given position along the longitudinal axis A, in which the position corresponds to the one in which the film 14 has to be fixed to the internal surface 12.

In the example shown herein, the stopping member 37 comprises a cylindrical element with a predetermined length, which is sized so as to be axially fitted into the internal chamber 11. The axial length of the stopping member 37 depends on the stopping position of the tubular element of the mounting tool 35 during the fitting thereof into the internal chamber 11. Therefore, in the example shown in FIG. 7, the tubular element of the mounting tool 35 is axially fitted into the internal chamber 11 until its internal end strikes against the internal striking end of the stopping member 37. Conveniently, in addition or alternatively to the use of the reference striking member 37, there can be a marking sign Ml on the electrical connection circuit 19. In this case, the tubular element of the mounting tool 35 is fitted into the internal chamber 11 until the marking sign reaches a predetermined reference point of the pedal-pin 2, preferably its end 2a.

Figure 8:
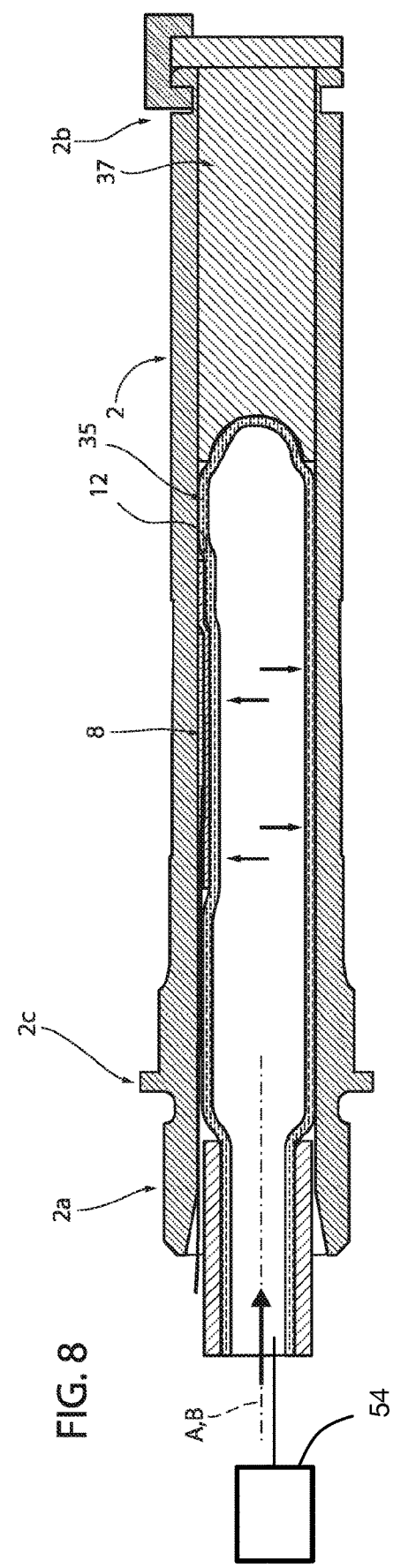

According to FIG. 8, the method comprises the step of radially expanding the tubular element of the mounting tool 35 so as to cause it to switch from the rest condition to the fixing operating condition, in which the film 14 is radially pressed by the tubular element against the internal surface 12 of the internal chamber 11, so that its adheres to the latter. The radial expansion can be obtained by feeding a fluid under pressure, for example air of a liquid, into the tubular element of the mounting tool 35. The radial expansion of the tubular element of the mounting tool 35 presses the film 14 against the internal surface 12, thus determining a compression of the intermediate adhesive layer, which conveniently reduces its thickness, and the fixing of the film 14 on the internal surface 12 of the pedal-pin 2. To this aim, the mounting tool 35 can comprise a feeding device to feed the fluid under pressure (not shown), which is hydraulically connected to the tubular element in order to provide it with fluid under pressure.

Preferably, the fluid under pressure can comprise air (or oil or the like) and can be fed by the feeding device into the tubular casing of the mounting tool 35 at a predetermined pressure. The pressure at which the fluid is fed into the tubular casing can vary depending on one or more parameters, among which there are, for example, the type of adhesive material and/or the geometry and/or the material of the tubular element.

According to the preferred embodiment, the method can further comprise the step of heating the fixing layer so that it hardens, while the tubular element of the mounting tool 35 is held in the fixing operating condition (in its maximum expansion) against the film 14. This operation can conveniently be carried out by inserting the pedal-pin 2—with the mounting tool 25 fitted on the inside—into an oven (not shown) and by subjecting the pedal-pin 2 to a given temperature for a predetermined amount of time. The amount of time and the temperature can change, for example, based on the fixing layer.

The method further comprises the step of shrinking the tubular element of the mounting tool 35 at the end of the fixing of the film 14 on the internal surface 12 of the internal chamber 11, so that it can go back to the rest condition, in which the external diameter thereof is smaller than the internal diameter of the internal chamber 11.

The method further comprises the step of extracting, on one side, the mounting tool 35 and, on the other side, the stopping member 37 from the internal chamber 11. The method further comprises detaching and removing the applicator sheet 18 and the adhesive tape 36 from the strain gauges 8 fixed on the internal surface 12 of the internal chamber 11 of the pedal-pin 2.

With reference to FIG. 10, the method further comprises the steps of: inserting the power storage device 10 into the internal chamber 11, and connecting the electronic circuit 9 to the strain gauges 8 by means of the connection circuit 19 and to the power storage device 10 by means of the wires 24. The method further comprises the step of fitting/inserting the electronic circuit 9 into the internal chamber 11 (as shown in FIG. 3).

Conveniently, the internal chamber 11 can completely or partially be filled with an elastomer resin so as to stop and avoid the vibrations of all the parts contained in it, in particular those belonging to the electronic circuit 9 and to the battery 10.

The method further comprises the steps of: inserting the bushing 21 into the hub 6, inserting the pedal-body 5 onto the pedal-pin 2 so that the half-annular bodies 31 and 32 can be fitted into the seat 30, and inserting the closing caps 33 and 34 into the relative ends 2b and 2a of the pedal pin 2 so as to seal the internal chamber 11.

Obviously, the invention is not limited to the use of one single film 14, but other embodiments are possible, which comprise a series of independent films 14 associated with respective strain gauges 8. For example, according to a possible embodiment, a group of eight strain sensitive patterns 13, instead of being arranged on one single film 14, can be divided into two groups of four strain sensitive patterns 13, each group being arranged on a relative film 14, or into four groups of two strain sensitive patterns 13 arranged on four films 14.

In this case, the films 14 can be arranged with precision in predetermined positions on a plane with suitable seats and then be temporarily coupled all together to one single adhesive applicator sheet 18.

For example, in case two films 14, each provided with four strain sensitive patterns 13, are used, the position of the films 14 on the applicator sheet 18 can be such as to hold the strain sensitive patterns 13 in the same position that they would have in a configuration with one single film 14.

The pedal described above has the advantage of using the pedal-pin as containing casing for the electronic measurement system, thus eliminating the space taken up by the electronic components thereof on the outside of the pedal-pin and the risk of damaging them.

The fixing of the strain gauges on the internal surface of the pedal-pin frees space on the inside of the internal chamber and allows all the elements of the measurement system to the accommodated inside it, especially a battery with a greater capacity.

Furthermore, the fixing of the strain gauges directly on the internal surface of the internal chamber through the thin adhesive layer increases the measuring precision.

Finally, it is clear that the pedal and the method described above can be subjected to changes and variations, without for this reason going beyond the scope of protection of the invention.

Figure 11A:
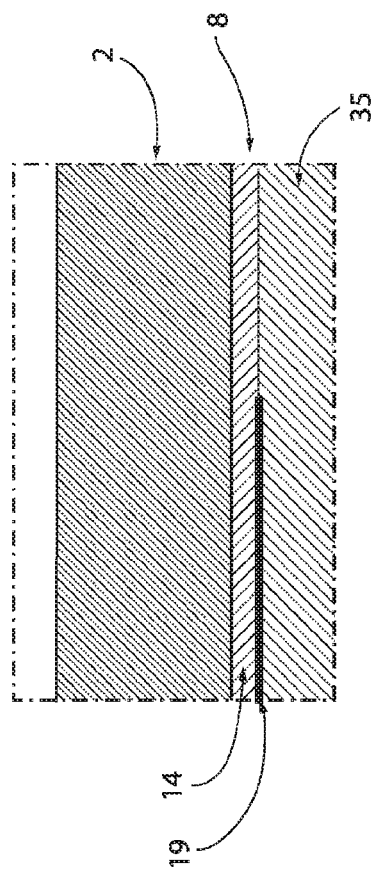
FIG. 11A is an enlarged view of a portion 60 of the variant of the operating step shown in FIG. 11, FIGS. 12 and 13 are two schematic views, with and without the presence of an applicator sheet respectively, of the strain gauges and of a flexible printed circuit board present in the pedal-pin according to a variant of the invention.
Figure 11:
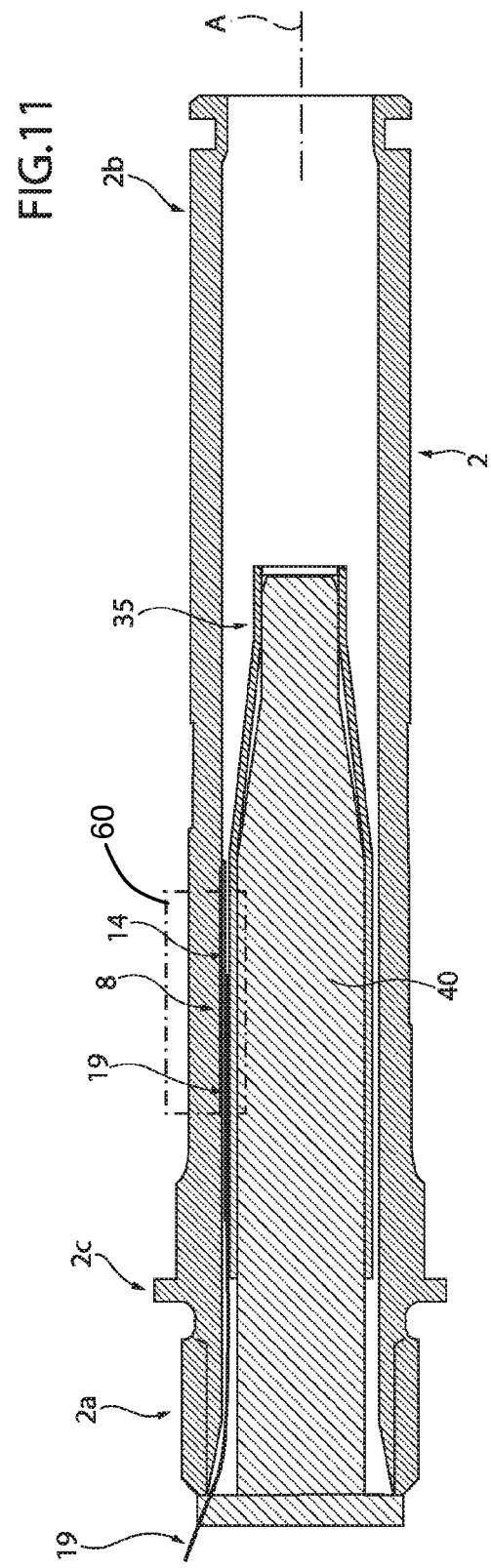
FIG. 11 shows a variant of an operating step of the method for manufacturing the pedal according to the invention.

For example, the embodiment shown in FIG. 11 relates to an operating variant of a step of the method for manufacturing the pedal 1.

According to this variant, the radial expansion of the tubular element of the mounting tool 35 during the fixing of the film 14 on the internal surface 12 of the internal chamber 11, instead of being obtained through the feeding of a fluid under pressure into the tubular element, is carried out by means of a mechanical expansion action, which involves fitting an expander member 40 into the tubular element. The expander member 40 can comprise a body having a circular cross section as well as a tapered end, so that it can easily be fitted into the tubular element of the mounting tool 35 and undergo a progressive radial expansion through elastic deformation. The diameter of the expander member 40 can be sized depending on some parameters, among which there are: the diameter of the internal chamber 11, the thickness of the film 14 and of the support sheet 18 and the thickness of the mounting tool 35, which is preferably made of silicone rubber. Hence, the expansion step of the method entails axially fitting the expander member 40 into the internal opening of the tubular element of the mounting tool 35 so as to progressively cause a radial expansion thereof against the internal surface 12 of the chamber 11 so as to press the film 14 and the adhesive/glue material layer against the internal surface 12.

The invention claimed is:

1. A pedal for bicycles comprising:
   a pedal-pin which extends along a longitudinal reference axis and has a first axial end structured to be coupled to a crank of a bicycle,
   a pedal-body coupled in a freely rotatable manner on said pedal-pin so that said pedal-body can rotate around said reference axis,
   at least one internal chamber which is made in said pedal-pin and has an internal surface that extends along said reference axis approximately coaxial to the pedal-pin,
   an electronic power measurement system comprising:
   strain gauges having a thin laminar structure, which are coupled to said pedal-pin and are configured so as to provide electrical measurement signals indicative of the mechanical deformation of the pedal-pin,
   an electronic processing circuit which is electrically connected to the strain gauges and is configured so as to determine, on the basis of these electrical signals, the mechanical deformation of the pedal-pin caused by the force exerted by the cyclist during pedalling on the pedal-pin via the pedal-body,
   said pedal being characterised in that:
   the strain gauges are rigidly fixed on the internal surface of said internal chamber by a fixing layer of adhesive based material, so that said strain gauges are supported by the internal surface in said internal chamber,
   said strain gauges are exclusively supported by said internal surface of said internal chamber.

2. The pedal according to claim 1, wherein said strain gauges comprise at least one flexible film made of electrically insulating material which is permanently fixed on said internal surface by of said fixing layer so as to be supported by the internal surface in said internal chamber, and a plurality of grid measuring strain gauges.

3. The pedal according to claim 2, wherein said internal chamber has an approximately circular section transverse to said reference axis, said strain gauge grids are, in pairs, angularly spaced, with respect one to the other, on said internal surface around said reference axis.

4. The pedal according to claim 3, wherein all said strain gauge grids are arranged on said internal surface of said internal chamber within an arc of circumference having an angle of width less than or equal to about 150°.

5. The pedal according to claim 3, wherein each pair of strain gauge grids is arranged on said internal surface so as to be angularly spaced by the adjacent pair of strain gauge grids at an angle of about 90°.

6. The pedal according to claim 1, where said strain gauge grids are structured to measure the shear strain, or to measure the longitudinal bending strain of the pedal-pin along the axis.

7. The pedal according to claim 1, wherein said strain gauges are rigidly fixed onto the internal surface of said internal chamber so as to delimit an inner containment space sized to house said electronic processing circuit and/or energy storage device.

8. The pedal according to claim 1, comprising a flexible printed circuit board which electrically connects said strain gauges to said electronic processing circuit and extends into said internal chamber.

9. The pedal according to claim 1, wherein said internal chamber consists of a dead hole or a through hole which extends on the pedal-pin along said reference axis.

10. The pedal according to claim 1, wherein said strain gauges have a thickness comprised between approximately 0.05 mm and approximately 0.15 mm.

11. The pedal according to claim 10, wherein said strain gauges have a thickness of approximately 0.08 mm.

12. A method for manufacturing a pedal for bicycles according to claim 1, comprising the steps of:
   a) prearranging an applicator sheet,
   b) placing said strain gauges on said applicator sheet,
   c) shaping said applicator sheet so that said applicator sheet can be inserted into said internal chamber,
   d) applying an adhesive fixing layer onto said strain gauges and/or onto the internal surface of said internal chamber,
   e) inserting said shaped applicator sheet into said internal chamber to position said strain gauges in a predetermined longitudinal position along said reference axis, f) radially expanding said applicator sheet in said internal chamber so as to arrange the strain gauges in contact with the internal surface of said internal chamber so as to fix said strain gauges permanently thereto, and detaching and removing the applicator sheet and the adhesive tape from the strain gauges fixed on the internal surface of the internal chamber of the pedal-pin, wherein said strain gauges are exclusively supported by said internal surface of said internal chamber.

13. The method according to claim 12, wherein said step c) comprises the step of prearranging an assembly tool provided with a tubular casing made of expandable material, and arranging said applicator sheet on the external surface of said tubular casing so as to wrap said tubular casing at least partially, said step e) comprises the step of inserting said tubular casing of the mounting tool provided with said applicator sheet and said strain gauges into said internal chamber, said step f) comprises the step of radially expanding said tubular casing of the mounting tool so as to press the strain gauges against said internal surface of the internal chamber so as to firmly fix the strain gauges onto said internal surface by said layer of adhesive material.

14. The method according to claim 13, wherein said mounting tool comprises a pressurised fluid supply connected to said tubular casing so as to radially expand expand said tubular casing; said step f) comprises the step of actuating in a controlled manner said pressurised fluid supply for supplying said pressurised fluid to said tubular casing so as to radially expand said tubular casing against the internal surface of said internal chamber.

15. The method according to claim 13, wherein said assembly tool also comprises a radial expander member; said step e) comprises the step of inserting said expander member into said tubular casing of said assembly tool so as to radially expand said tubular casing against the internal surface of said internal chamber.

* * * * *